March 30, 1954

G. N. BUMSTEAD 2,673,487

COPYING CAMERA

Filed Dec. 31, 1948

G. N. BUMSTEAD 2,673,487

COPYING CAMERA

Filed Dec. 31, 1948

Inventor
G. N. Bumstead,
By
Attorney

March 30, 1954

G. N. BUMSTEAD 2,673,487

COPYING CAMERA

Filed Dec. 31, 1948

Inventor
G. N. Bumstead,
By
Attorney

March 30, 1954

G. N. BUMSTEAD

2,673,487

COPYING CAMERA

Filed Dec. 31, 1948

Inventor
G. N. Bumstead,

Attorney

March 30, 1954

G. N. BUMSTEAD 2,673,487

COPYING CAMERA

Filed Dec. 31, 1948

Inventor
G. N. Bumstead,
By
ATTORNEY

Patented Mar. 30, 1954

2,673,487

UNITED STATES PATENT OFFICE 2,673,487

COPYING CAMERA

George Newman Bumstead, Bethesda, Md., assignor to National Geographic Society, a corporation of the District of Columbia Application December 31, 1948, Serial No. 68,566

15 Claims. (Cl. 88—24)

This invention relates to cameras, and more particularly to those of the copying type, having for its prime object to provide a mechanism which is more positive and accurate in action, and more practical, in use, than those heretofore proposed.

A further object of the invention is to provide a camera wherein the lens is automatically focused in accordance with the size of reduction or enlargement desired in the finished product.

Another object is to provide an automatic control for the feed of the photographically sensitized film upon which the image is reproduced whereby said feed is in accordance with the size of the reproduction desired.

Still another object is to provide automatically for the combination of the lens focusing and the film feed in accordance with the size of the reproduction desired.

With these and other objects in view the invention resides in the novel details of construction and combinations of parts as will be disclosed more fully hereinafter and particularly covered by the claims.

Referring to the accompanying drawings forming a part of this specification and in which like numerals designate like parts in all the views—

The rigid camera base is indicated by the numeral 2, and rigidly secured thereto and rising vertically therefrom in parallel relation to each other are two guides or tracks 3 and 4 which preferably are of circular transverse section, the upper ends of said guides being interconnected for rigidity by a brace 5. A carriage generally identified by the numeral 6 is mounted for vertical travel upon said guides, said carriage being provided at each of its opposite sides or ends with a bearing structure embracing a guide, said structure comprising an upper set of three friction rollers and a substantially identical lower set of three friction rollers, said rollers engaging the outer surface of the embraced guide. Since both bearing structures are substantially identical, only one is particularly illustrated (see Fig. 12), the arrangement of the three rollers constituting one set being such that roller 7 engages the forward face of the guide 3, the second roller 8 engages the rear face of said guide, and the third roller 9 engages the outermost side face of said guide; the corresponding set, of the other identical bearing structure, has its three rollers similarly situated, the foremost roller being identified in Figs. 1 and 3 by the numeral 10. The bearing structures are interconnected by the plate 11 disposed in front of the pair of guides, and interconnected by the plate 12 disposed in back of said guides.

Figure 1:
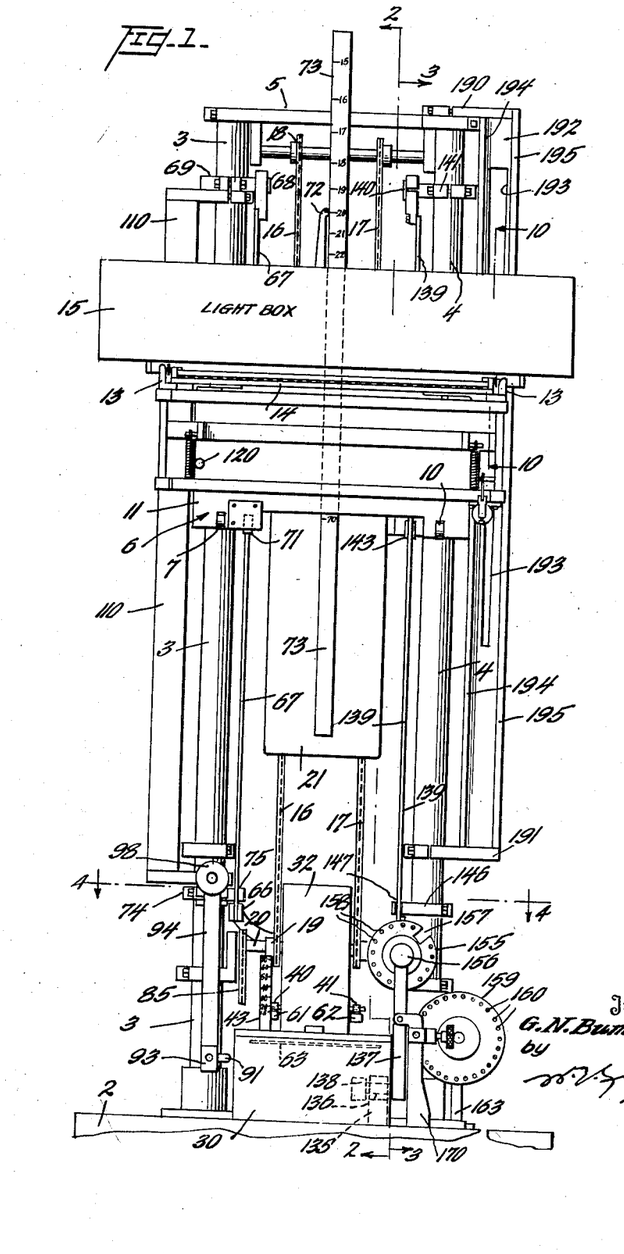
Fig. 1 is a front elevational view of a camera made in accordance with this invention.
Figures 2, 5, 6, 7:
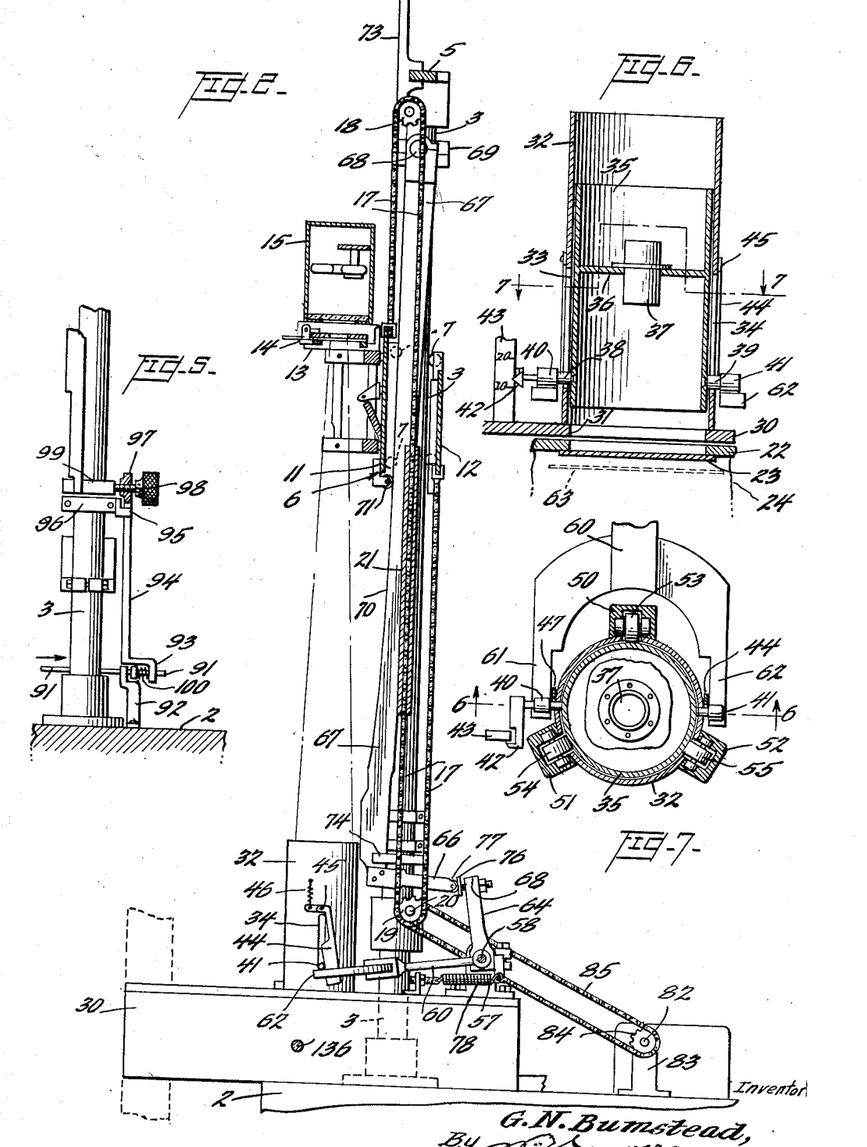
Fig. 2 is a vertical sectional view of the camera taken as on the line 2—2 of Fig. 1 and looking in the direction of the arrows.
Fig. 5 is a detail view illustrating a manual control for the clutch interposed in the drive mechanism for raising and lowering the carriage of the camera.
Fig. 6 is a vertical sectional view of the lens mounting, said view being taken as on the line 6—6 of Fig. 7 and looking in the direction of the arrows.
Fig. 7 is a horizontal sectional view of the lens mounting, taken as on the line 7—7 of Fig. 6 and looking in the direction of the arrows.

To the front plate 11 (Figs. 1, 2 and 3) is secured a saddle 13 for supporting the composing frame 14 containing the light-transmitting material or object to be photographically reproduced by this camera. Said composing frame, said carriage and the bearing structures therefor, are particularly described and illustrated in by copending application filed January 15, 1948, under the Serial No. 2,532 and entitled Composing Frame for Use in Photographic Reproduction. Said carriage also carries at its top a light box, generally identified by the numeral 15, having any suitable source of light therein (preferably of the cold cathode type), the rays of which are free to pass downwardly through the transparent material or object to be photographically reproduced. Thus it is to be understood that the light box and the composing frame are mounted for vertical travel with the carriage upon guides or tracks 3 and 4, this travel being accomplished by virtue of the parallel chains 16 and 17 one end of each of which is attached to the upper portion of the carriage, said chains as best seen in Fig. 2 passing over identical upper sprockets such as 18 carried by a shaft supported by the cross brace 5, thence passing downwardly and reversely over identical lower sprockets such as 19 mounted upon a shaft 20 having end bearings secured upon said guides, and then passing upwardly with their opposite ends secured to the lower portion of said carriage, the sprockets 18 and 19 being identical. Rotation of the lower shaft 20 is imparted by means later to be described. A weight 21 is preferably secured to said chains 16 and 17 to counterbalance the weight of the carriage assembly.

This camera is intended to be mounted just outside a vertical wall of a dark room suitable for loading and unloading sensitized film to and from a film carrier, said carrier preferably comprising a light-tight box, a portion of the cover of said box being indicated by the numeral 22 in Fig. 6. Said carrier (box) is reciprocable horizontally to and from a position where its contained film can be exposed, by operation of a suitable shutter 23 in the cover of said carrier (partially indicated in Fig. 6 by the numeral 24), to the rays of light originating from the light box and passing downwardly through the material (transparency) or object in the composing frame as well as through a suitable lens structure. Such a carrier forms the subject matter of my copending application Serial No. 21,994 filed April 19, 1948, and entitled Box for Sensitized Medium Used in Photographic Reproduction, now U. S. Patent No. 2,555,631, issued June 5, 1951.

The wall of this dark room is apertured and provided with an extension therearound in the nature of a rectangular light-proof chamber into and out of which said carrier is reciprocated, said chamber being generally identified by the numeral 30 (Figs. 1, 2, 4 and 6) and conveniently though not necessarily resting upon and secured to the camera support 2.

*Lens mounting*

The top wall of this chamber has a suitable aperture 31 therein which is centered on the central vertical axis of the light rays passing through the material in the composing frame 14, and surrounding said aperture and extending upwardly from said chamber 30, is an opaque cylindrical lens housing 32. In the lower portion of this housing there is provided a pair of vertical slots 33 and 34 in diametric opposition to each other, said slots terminating short of the lower edge of said lens housing.

Vertically reciprocable in the housing 32 is an opaque open-ended cylinder 35 having an internal horizontally disposed opaque plate 36 which is centrally apertured to receive the lens generally identified by the numeral 37, said lens rigidly secured to said plate. Near the bottom of said cylinder and rigidly secured thereto in diametric axial opposition, is a pair of outwardly extending spindles or arbors 38 and 39 upon which are freely mounted the rollers 40 and 41 respectively, said arbors extending through the respective slots 33 and 34, with said rollers external with respect to the lens housing 32.

Figures 3, 4:
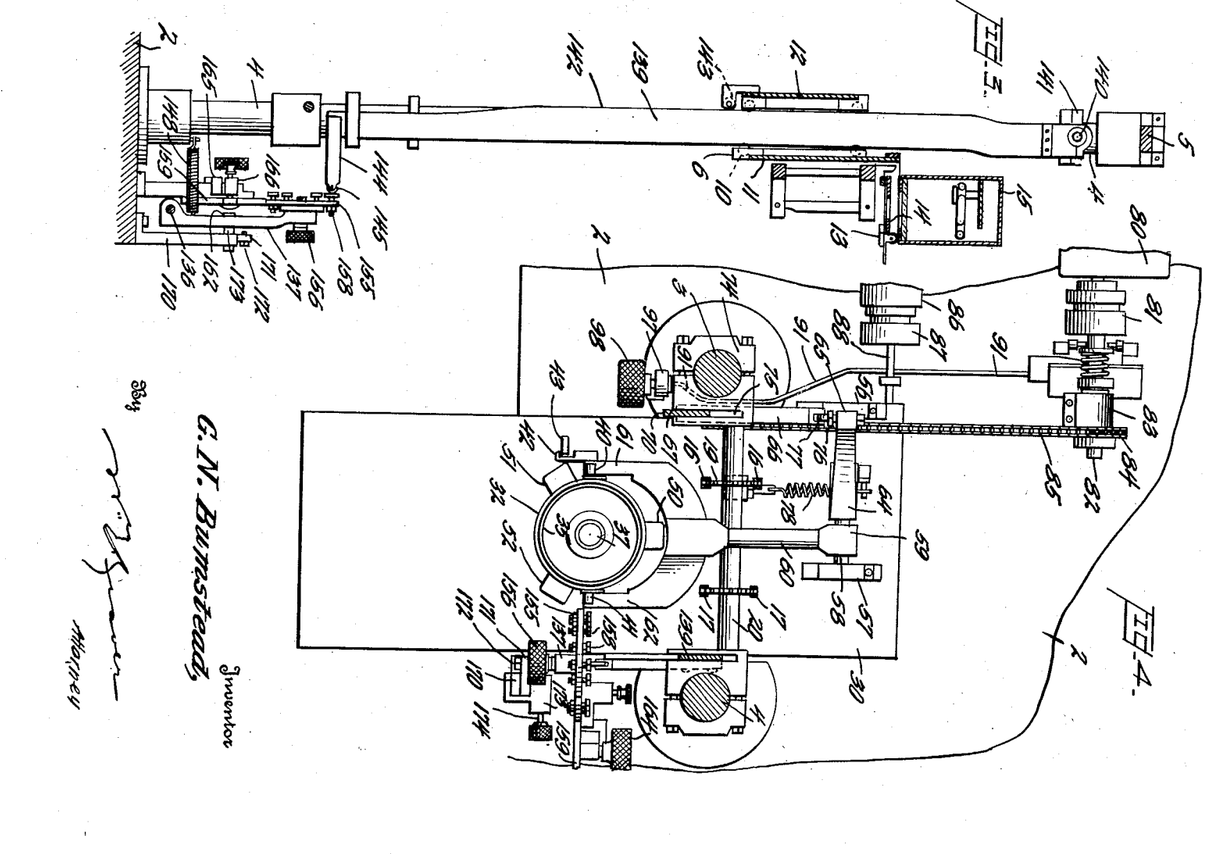
Fig. 3 is a vertical sectional view of the camera taken as on the line 3—3 of Fig. 1 and looking in the direction of the arrows.
Fig. 4 is a horizontal sectional view taken as on the line 4—4 of Fig. 1 and looking in the direction of the arrows.
Figures 8, 9:
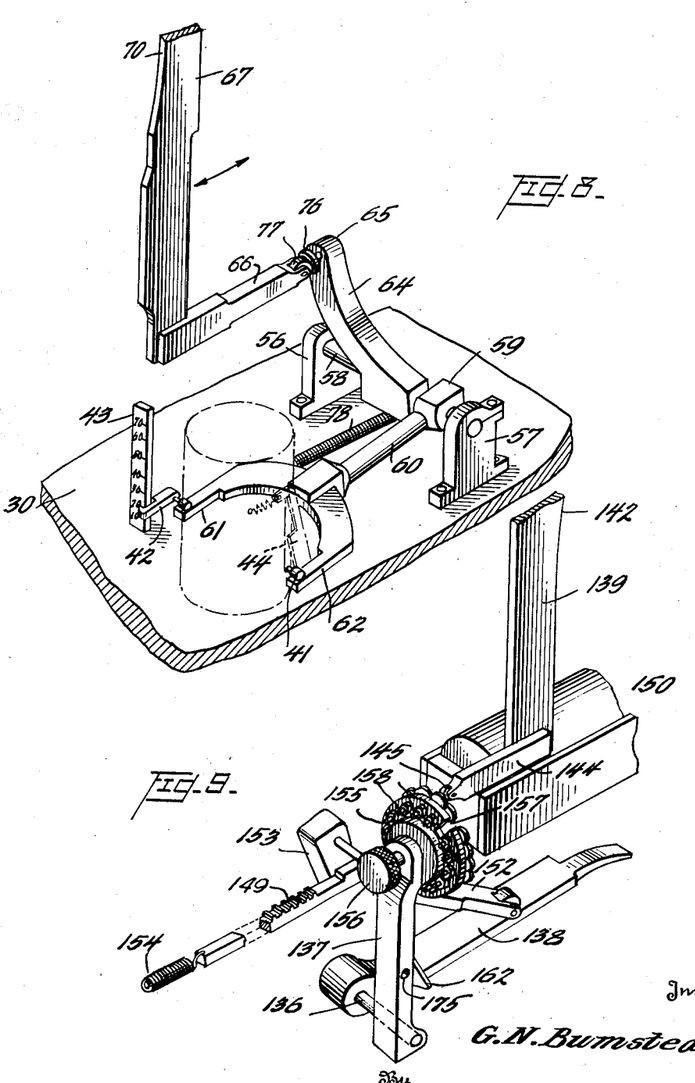
Fig. 8 is a perspective view of the lens focusing mechanism to better illustrate the cam-controlled leverage thereof.
Fig. 9 is a perspective view to better illustrate the cam-controlled leverage for adjustably affecting the feed of the film upon which the object is to be photographically reproduced.

Light, which might pass through said slots, is prevented from direct action upon the lens by virtue of the imperforate nature of the wall of the cylinder 35 and its relatively close sliding fit in the lens housing 32. One of the arbors such as 38 is extended and upon its outermost end is rigidly secured an index finger 42 for cooperation with scale markings on the front face of a vertical scale 43 secured to and extending upwardly from the top of chamber 30 (Figs. 1, 4 and 8). A shield 44 (Figs. 2 and 6) is pivotally mounted at its upper end as at 45 exteriorly of the lens housing, and is under the constant urge of spring 46 to move to a position to cover at least the lower portion of slot 34 when the lens cylinder 35 is moved to elevated positions, the arbor of roller 41 having contact with one cam-formed edge of said shield (as clearly illustrated in Fig. 2) whereby said shield may cover said slot more quickly and positively in the initial upward movement of the lens. A duplicate shield 47 is provided with relation to the other and opposite slot 33 of the lens housing, and governed by the arbor of roller 40. The purpose of these duplicate shields is to cover their respective slots so that light may not enter and pass through aperture 31, and the opened shutter, to adversely affect the film 63, when the lower edge of the lens cylinder has risen to or above a point of registration with the lower ends of slots 33 and 34.

The lens housing 32 preferably is provided with three hollow external housings 50, 51 and 52 substantially equally spaced horizontally from each other and having mounted therein the rollers 53, 54 and 55 respectively, each roller having a portion extending through a suitable aperture in the wall of the lens housing 32 so as to bear against the outer surface of the lens cylinder 35, whereby to make the vertical reciprocations of said cylinder substantially frictionless as well as to insure positive centering of said cylinder in the lens housing (see Figs. 4 and 7).

A pair of opposed brackets 56 and 57 are secured to and extend upwardly from the top of the chamber 30 and serve as bearings for a horizontal rock shaft 58 to which is rigidly secured the rear end 59 of a lever or arm generally identified by the numeral 60 whose forward end is formed as a fork the branches or legs 61 and 62 of which straddle the lens housing and are positioned respectively under the rollers 40 and 41 carried by the lens cylinder 35 (Figs. 1, 2, 4, 6, 7 and 8). It thus results that when the fork is moved upwardly the lens 37 will be raised correspondingly and thereby change the distance from said lens to the film within the box 21, the position of said film being indicated in dotted lines at 63.

Lens focusing

The means for focusing the lens is shown in Figs. 1, 2, 4, 6, 7 and 8. Rigidly mounted on the rock shaft 58 is one end of another lever or arm 64 whose free end 65 is in the relatively short path of movement of an arm 66 rigidly secured to and extending from the bottom of a cam bar 67 freely pivoted at its upper extremity as at 68 to a collar 69 rigidly secured to the guide 3. The cam bar 67 rocks in a vertical plane normal to the plane of symmetry through the axes of the guide bars 3 and 4, and the forward edge of this cam bar is accurately formed as a cam surface 70 for cooperative engagement with the cam roller 71 carried by the carriage 6. The cam bar is of considerable vertical extent, and its purpose is to automatically focus the lens with respect to the film, as the carriage 6 (containing the object to be photographically reproduced on the film) is moved vertically on its guides 3 and 4.

To this end the cam bar is so designed and pivotally mounted that its cam surface 70 will always be in contact with the carriage roller 71. This contact is insured by the weight of the lens assembly acting through the levers 60 and 64, the latter contacting the arm 66 of said bar. When the carriage is at its uppermost limit of travel, said bar will be at its foremost swing and the lens 37 will be in its lowermost position of focus, whereas when said carriage is at its lowermost limit of travel, said bar will be at its rearmost swing and the lens 37 will be in its uppermost position of focus, all due to the action of the cam bar 67 as transmitted through the lever arms 64 and 60.

To provide for quick and accurate focusing of the lens through the instrumentality of the cam bar 67, the carriage has rigidly mounted thereon an index finger 72 cooperating with a vertical scale 73 rigidly carried by the cross bar 5 of the camera (Fig. 1), the markings on said scale conveniently being in percentages of size of photographic reproduction (with reference to the transparency in the composing frame being photographed), whereby the carriage may be moved on its guides until its index finger registers with the scale marking corresponding to the percentage of original size desired in the reproduction, whereupon the lens automatically will be focused to give a sharply defined reproduced image on the film.

To insure the swing of the cam bar 67 in substantially a true vertical plane, a collar such as 74 may be rigidly mounted on guide 3, said collar provided with a slot 75 closely embracing said cam bar near the lower extremity thereof. This is necessary so that the end of the arm 66 at the bottom of the cam bar will always be in proper contact with the free end 65 of lever 64. Adjustability of this contact may be effected as by the take-up screw 76, and a substantially non-wearing contact may be insured through the provision of the roller 77 on the arm 66 as clearly illustrated in Figs. 2, 4 and 8. A spring 78 (Figs. 4 and 8) may be utilized in connection with the lever arm 64 (and hence the rock shaft 58) to partially counterbalance the weight of the yoked lever 60 and the lens assembly, and thus reduce the effort of the combined leverage in raising the lens 37.

Carriage and film box movement

The carriage may be moved manually or by any suitable means. One such means is particularly illustrated (Figs. 1, 2, 4 and 18) as comprising a reversible electric motor (with suitable reduction gearing) 80 operating, through a clutch 81, a shaft 82 mounted in a bearing 83, said shaft having rigidly mounted thereon a sprocket 84 having enmeshed therewith a chain 85 which is also enmeshed with a sproket rigidly carried by shaft 20. Actuation of the chain 85 will cause movement of chains 16 and 17, attached to the carriage, in accordance with the direction of rotation of said motor, and thus raise or lower said carriage. The motor is controlled by the manipulation of a suitable electric switch (see Fig. 18), and will be stopped when the carriage index finger is in registration with the scale marking designating the percentage of original size desired in the photographic reproduction.

Figure 18:
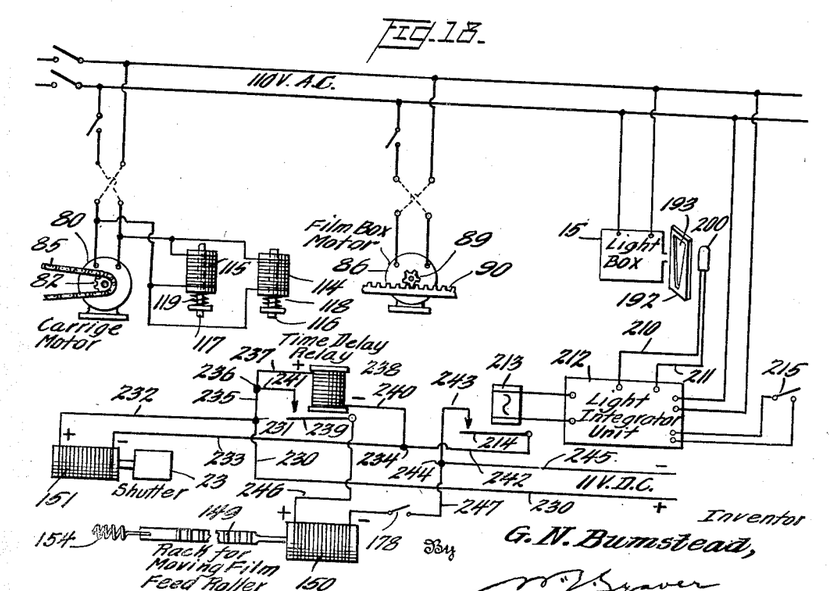
Fig. 18 is a general wiring diagram of circuits that may be employed in connection with this camera.

The film containing box may be moved into and out of the chamber 30 manually or by any suitable means, one such means being indicated in Figs. 4 and 18 as comprising a reversible electric motor 86 operating, through reduction gearing and a clutch 87, the shaft 88 extending through a side wall of chamber 30 and having mounted thereon (within said chamber) a pinion 89 in engagement with a horizontal rack 90 carried by said film box, this being the mechanism disclosed in my copending application Serial No. 21,994 referred to hereinabove.

Manual movement of the slidable carriage is made possible through disengagement of clutch 81, as indicated in Figs. 1, 4 and 5. One of the members of said clutch has a rod or arm 91 extending substantially horizontally toward the front of the camera, the forward end of said rod passing through the upper portion of a bracket 92, rigidly secured to the camera support 2, and having rigidly secured to its end the lower extremity 93 of a vertical lever 94 pivoted as at 95 to a collar 96 secured upon the guide 3. The upper extremity 97 of said lever is above said pivot and is threaded for receiving a bolt 98 the head end of which preferably is knurled as shown for engagement by the fingers of the camera operator, the other end of said bolt adapted to bear against a stationary stop member 99 carried by said guide or by said collar 96.

A spring associated with the clutch member has the constant tendency to push the rod 91 forwardly as indicated by the arrow in Fig. 5 and, through lever 94, to maintain contact between bolt 98 and its stop member 99. By manually turning the bolt, said lever is oscillated about its pivot, movement in one direction forcing said rod rearwardly and causing disengagement of the clutch 81, whereupon the friction of the electrical drive mechanism and associated connections is removed and the slidable carriage may be raised or lowered manually with ease. Instead of a rigid connection between said rod and said lever, there may be provided a yieldable spring connection as indicated at 100.

Carriage lock

Means for locking the slidable carriage in its adjusted position, to insure accuracy in the desired percentage of size of the photographic reproduction, is indicated in Figs. 1, 12, 13, 14 and 18. Laterally of the guide 3 and secured thereto, is mounted a vertical locking bar 110 the rear face of which may be positioned just forward of the back plate 12 of the carriage, and extending into said bar from said rear face are a plurality of apertures arranged in two vertical rows as indicated particularly in Fig. 12 at 111 and 112. These apertures are spaced vertically from each other in accordance with the scale markings carried by the carriage scale 73 wherefore, when pins carried by the carriage are engaged in said apertures, the carriage will be locked against accidental and/or undesired movement; in other words, the such locking engagement will take place at a desired and designated registration of carriage index finger 72 with a specific scale marking. The arrangement of said apertures in two vertical or offset rows is due to the fact that the vertical spacings of some of the scale markings are so close that their corresponding locking apertures would conflict or intercept if located in a single vertical row.

Rigidly mounted on the back plate 12 of the carriage is a frame generally identified by the numeral 113, said frame carrying two electric solenoids 114 and 115 positioned so that their respective plungers 116 and 117 are coincident with the planes of the two vertical rows of apertures, and constitute the locking pins for engagement with said apertures. The plungers of these solenoids are under the tension of springs 118 and 119 respectively, normally urging them in a direction to engage the apertures, but when said solenoids are electrically energized (as when the carriage is being electrically and mechanically raised or lowered) the plungers will be retracted from the apertures and thus permit the carriage to slide. When the carriage index finger approaches and nears registration with the desired scale marking, the switch controlling the locking solenoids (as well as controlling the carriage moving motor 80) will be opened by the operator (see Fig. 18), whereupon the carriage will "coast" under its inertia and ultimately stop at the desired registration due to one of the spring tensioned solenoid plungers engaging an aperture. In this connection it should be stated that the carriage is electrically moved at a relatively low speed, and the motor clutch 81 is so designed as to be capable of "slipping" in order to yield when a solenoid plunger snaps into a locking aperture.

When the carriage is moved manually to its desired adjusted position, a rod 120 is manipulated in one direction to throw a cam disc or lever 121 to mechanically retract said plungers against the action of their springs and to hold them retracted while and until the desired adjustment or scale registration is attained, after which said rod is reversely manipulated. Thereupon the springs will function to bring about locking engagement between a plunger and the aperture corresponding to the adjusted position of the carriage. For this purpose, the two plungers are mechanically tied together as by the bar 122 against the surface of which the cam or lever 121 operates.

Any suitable indication (such as a "green" electric telltale signal lamp) is preferably provided on the side of safety and accuracy so that, when said lamp becomes illuminated, the operator of the camera will know that the carriage is locked in its correctly adjusted position. This electric lamp may be positioned in full view of the operator and connected in any suitable electric circuit (not illustrated), which circuit however is controlled by the action of the solenoids 114 and 115 through mechanism shown in Figs. 12 and 13.

This mechanism comprises two micro-switches 123 and 124, one for each solenoid, rigidly mounted upon the frame 113 or an extension thereof. Each micro-switch is of standard design as found in the trade, and of the type which is inherently normally closed, said switch having an externally mounted spring lever (125 and 126 respectively) for operating the circuit-controlling contact members within the switch assembly, said lever so mounted as to have its free end extend across and be operable by the rear end of the plunger of its associated solenoid. Therefore, when the plunger such as 116 of solenoid 114 is engaged with a locking aperture, the rear end of said plunger is advanced in position such that its associated lever 125 flexes outwardly to permit the normal closing of the circuit-controlling contact members of microswitch 123, thereby causing the illumination of the green indication signal lamp. When this occurs, the plunger 117 of the other solenoid 115 will be out of engagement with a locking aperture (since only one plunger may be locked at a time) and therefore have its rear end retracted to flex its associated lever 126 inwardly and thus open the circuit-controlling contact members of the other micro-switch 124. However, the two micro-switches are so connected in circuit, and the throw of the levers 125 and 126 is such, that the green lamp becomes illuminated only as and when one or the other of the solenoid plungers has moved forwardly a sufficient distance to engage a locking aperture, and said lamp is not illuminated when both of said plungers are simultaneously out of engagement with any apertures. Therefore, if said lamp is not illuminated, the operator knows that proper scale registration does not exist, and so must move the carriage (manually or electrically) to bring about the desired registration and the locked condition thereof.

Film feed control

The film is fed past the shutter 23 (Fig. 6) in sequential steps after each exposure, and the distance it travels in each step is automatically governed primarily by the setting of the carriage 6 for the desired size of reproduction of the material or object contained in the composing frame 14, and secondarily by a manual adjustment in accordance with the desired spacing on the film between two adjoining exposed reproduction or images. The mechanism for accomplishing this is illustrated in Figs. 1, 3, 4, 9, 15, 16, 17 and 20.

Upon the camera base or support 2, and forwardly of the guide 4, there is rigidly mounted an upwardly extending bracket 135 in which is oscillatably mounted a horizontally disposed pin 136 one end of which is rigidly connected to the lower end of a vertically extending arm 137, the opposite end of the pin being rigidly connected to one end of the horizontally extending lever arm 138, the members 136, 137 and 138 in effect constituting a bell-crank (see Figs. 1 and 9) operable generally in a vertical plane parallel to the vertical central longitudinal plane of the chamber 30 constituting the extension of the dark room.

A second cam bar 139, of considerable vertical extent, has its upper end freely pivoted as at 140 to a collar 141 rigidly secured to the camera guide 4, said cam bar depending from its pivot as clearly shown in Figs. 1 and 3. The cam bar 139 rocks in a vertical plane normal to the plane of symmetry through the axes of the guide bars 3 and 4, and the rear edge of this cam bar is accurately formed as a cam surface 142 for cooperative engagement with the cam roller 143 carried by the carriage. To the lower end of this cam bar there is rigidly attached an arm 144 extending in a forward direction in the same vertical plane of, and to make contact with, the bell-crank arm 137, the free end of said arm 144 preferably being provided with a roller 145 to reduce the frictional contact between both arms. A collar 146 rigidly mounted on the guide 4 is provided with a slot 147 closely embracing said cam bar near the lower extremity thereof to insure the swing of said cam bar in substantially a true vertical plane including the bell-crank arm 137. This cam bar is, in a way, similar in construction, mounting and operation, to the cam bar 67 heretofore described but its purpose is to automatically control the feed of the film in accordance with the ratio between the desired size of reproduction of the material in the composing frame and the spacing between two adjacent lines of the reproductions on the film. The cam bar 139 is so mounted that its cam surface 142 will always be in contact with the carriage roller 143.

When the carriage is at its uppermost limit of travel, said bar will be at its foremost swing and the bell-crank will be oscillated thereby to elevate the arm 138 thereof to permit the minimum operative travel of rack 149 (controlled by the solenoid 150) in the film box to give the minimum rotation to the film feed roller and thus cause the film strip to be moved its minimum amount preparatory to the next exposure thereof. Conversely, when the carriage is at its lowermost limit of travel, said cam bar will be at its rearmost swing and the spring 148 (Fig. 3) will assist in the oscillation of the bell-crank in a reverse direction and thus depress the bell-crank arm 138 to result in the maximum amount of film feed, the mechanism for causing this film feed within the film-containing box being generally shown diagrammatically in Fig. 20, and specifically disclosed in and covered by my said copending application Serial No. 21,994, now Patent No. 2,555,631, granted June 5, 1951.

The arm 138 is additionally assisted in its downward oscillation by the arm 152 pivotally mounted on the film box and having the arm 153 within the box, which arm 153 is always under the urge of the spring 154 acting through the rack bar 149, all as disclosed particularly in my said copending application.

*Coaction of lens focusing and film feed*

Thus it will be understood that, as the carriage 6 is moved on its guides 3 and 4 to, and locked in position with respect to, the selected scale marking representative of the size of photographic reproduction desired, the cam bar 67 will automatically effect the proper focusing of the lens, and simultaneously the cam bar 139 will automatically effect the proper feed of the film to maintain the same ratio between selected sizes of reproductions and the spacing between the lines thereof. This camera is particularly adapted to make reproductions of lines of type, whether each reproduced line is a complete entity which is independent of and separable from any other reproduced line, or each reproduced line is a part of a connected text requiring definite and/or different spacing from its next adjoining line so as to produce in the film reproduction a semblance to a paragraph or page.

That is to say, in the preparation of a map requiring the application thereto of names of cities, rivers, mountains, etc., wherein such names are preferred to be in approved and standardized types of printing, the letters of such names are assembled in the composing frame to form a complete name constituting the object to be reproduced, then the composing frame is positioned on the carriage and said carriage adjusted vertically in accordance with the size of photographic reproduction desired of that name, and then the film is exposed to obtain the reproduction. Since a plurality of reproductions of the same name may be desired, this may be accomplished simply by making plural successive exposures of the one name (or set up) in the composing frame, thereby producing a resultant film negative of said plurality from which an ultimate print can be made containing said plurality. Then the print can be severed to obtain the plurality of reproduced names as individual entities which may be stored alphabetically, for example, for future use and/or application to a basically drawn map.

In such case, the cam bar 139 is instrumental in automatically maintaining a separation distance between two adjoining reproduction lines (and hence an amount of film feed) which is of the desired proportion to the height of the letters in said lines, regardless of the actual percentage of photographic reproduction of any line. It should be pointed out that the source of light in the light box 15 is very intense, and that the lens housing 32 is capable of effectively passing only the light from said source to the film when the shutter 23 (controlled by the solenoid 151) in the film box is open (any extraneous light, such as that of the room in which the camera is located and which might enter said housing, being relatively weak as compared to the light from the light box, and therefore ineffective), wherefore the film will be affected only by the name or object in the composing frame. On the other hand, in the preparation of text comprising paragraphs, pages, or continuing interdependent lines of words, a complete line is assembled in the composing frame, the carriage is adjusted vertically in accordance with the size of photographic reproduction desired of that line of the text, and then the film is exposed. Since spacing of lines is necessary in the formation of continuing text, and the exposed and developed film is utilized in one operation to make a photographic print of the desired paragraph, pages, or continuing interdependent lines of words, the following described means has been provided for changing the amount of film feed per line exposure, to give the necessary and/or desired line spacing.

Change in amount of film feed

A circular manually operable adjusting disc 155 is freely and rotatably mounted upon the upper end of bell-crank arm 137, which disc is adapted to be secured in any selected position of its rotation by any suitable clamping means operable as by the knob 156 (see particularly Figs. 1, 3, 4, 9 and 15). A slot 157 is formed to extend inwardly from the periphery of said disc, said slot of a width and length to pass the roller end of arm 144 of cam bar 139, for a purpose to appear hereinafter. Around the peripheral portion of said disc is arranged a series of lugs or bolts such as indicated at 158, said bolts being spaced from each other, disposed in a circular row concentric with the pivoted mounting of said disc, and extending substantially at right angles to the general plane of said disc, whereby the roller end of said arm 144 may contact the head end of any selected bolt in the series upon the circular adjustment of said disc. Each bolt is supplied with any suitable means (such as one or more nuts) by which the extent of the bolt through the disc may be accurately fixed.

One of these bolts preferably is particularly distinguished from the others, as by (red) coloration, form, etc., and has its amount of extent through the disc so calculated and fixed by its locking nuts that, when this bolt is positioned for contact with the roller 145 of said arm 144, the bell-crank (137—138) will be adjusted to result in a certain proportion of line spacing to height of letters in a reproduced line, and hence govern the amount of film feed accordingly (as for example the minimum amount of feed). This certain proportion of line spacing will thereupon be automatically maintained throughout the entire range of vertical movement of the carriage according to the size of photographic reproduction desired, due to the contour of the cam bar 139.

The other bolts in the series are accurately adjusted and fixed so as to have amounts of extent through the disc which are different from each other as well as different from the distinguishing (red) bolt. These different extents are selected with regard to the possible and/or desired changes in the amount of separation between any two exposures, and each of these other bolts may be appropriately designated by indicia thereon or on the surface of the disc adjacent thereto. The preceding description is with regard to the automatic spacing of the lines and/or feeding of the film, but means are provided for manually accomplishing the same, which means will now be described.

In connection with the foregoing, the following explanation is necessary. The formed surface 142 of the cam bar 139, is designed basically with regard to the dimensions and mountings of the particular red bolt as well as of the leverages heretofore described and constituting the means for causing film feed, and consequently said formed cam surface results in a certain and definite ratio of line spacing to height of letters for reproductions throughout the entire range of carriage movement. The purpose, therefore, of the other bolts is to add dimensional increments, which, by altering the positional relationship established by the red bolt between the bell-crank arm 138 and the cam bar 139, will through arms 152 and 153 result in different amounts of throw or travel of the film feed rack 149 within the film box.

Manual instead of automatic adjustment of separation distances, between any two reproductions of adjoining lines of type, will be found highly desirable as in the case of reproducing the several lines of type found in titles for maps, as an example. That is to say, in such map title setup or composition, it is usual to have at least one line in large lettering, and the remaining lines in smaller and varying heights of lettering, wherefore it would be advantageous to have line separation distances which were pleasing to the eye and/or in accordance with (or proportional to) the said variation in lettering. Possibly there will be a situation where an extremely large space will be required between two reproduced lines, and which space could only be effected manually due to the mechanical limits of film feed under the automatic adjustment heretofore described.

To this end a second adjusting disc 159 is provided which is somewhat similar to the disc 155 previously described in connection with the automatic space adjustment, in that it is provided with a circular series of bolts or lugs, such as indicated at 160, spaced from each other and extending through the disc closely adjacent the peripheral edge thereof (see Figs. 1, 3, 4, 9, 15 and 16). These bolts also vary in length of extension from a face of the disc, and such extension is accurately calculated, for example, to result in variations of film feed (for example as measured in hundredths of an inch), and said bolts may be appropriately marked with indicia representative of such variations. A slot or notch 161 is formed to extend inwardly from the periphery of the disc, which notch is adapted to be brought into and out of registry with a finger 162 (Figs. 3 and 9) extending laterally from and rigidly secured to the arm 137 of the bell-crank associated with the automatic film feed, as will be described hereinafter.

The disc 159 is pivotally mounted at its center for circular adjustment. This mounting comprises a standard 163 rigidly secured to, and extending upwardly from, the camera base 2, and through the upper end of which the shaft of said disc is rotatably positioned. Any suitable clamping means may be provided for securing said disc in any of its circularly selected adjusting positions, there being shown in Figs. 4 and 16 a knurled knob 164 for operating the clamping means.

The disc is positioned for cooperating abutting contact between said finger 162 and the head of any bolt 160 selected by the rotated adjustment of said disc, the notch 161 permitting said finger to pass therethrough when the disc is adjusted to bring about registration of said notch with said finger, said registration being necessary when automatic film feed is desired.

Figures 15, 16, 17:
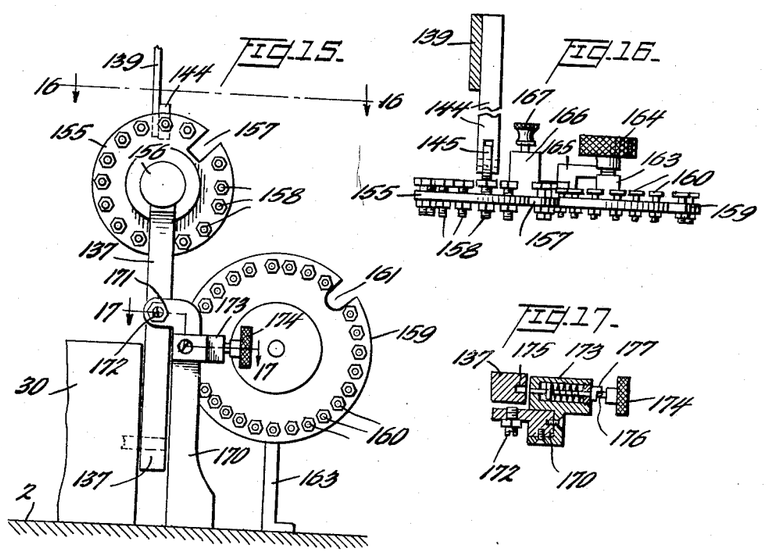
Fig. 15 is an enlarged vertical sectional view illustrating the means employed for controlling the setting of the cam used in connection with the feed of the sensitized film.
Fig. 16 is a horizontal sectional view taken as on the line 16—16 of Fig. 15 and looking in the direction of the arrows.
Fig. 17 is a horizontal sectional view taken as on the line 17—17 of Fig. 15 and looking in the direction of the arrows.

The rear face of the disc is provided with a circular series of indentations, each indentation corresponding to one of the bolts, and the standard 163 has an arm 165 rigid therewith, which arm has a portion serving as a bearing and housing 166 for a spring tensioned detent or plunger 167 manipulated by any suitable means such as the hand knob shown in Fig. 16. The axis of said plunger is at right angles to the face of the disc and adapted to register with the circular series of indentations, to the end that when the disc has been rotated to bring a desired bolt into position for its contact with the finger 162, the disc may be locked to maintain said bolt in that position by engagement of said plunger with the indentation corresponding to said bolt.

Another standard 170 is rigidly secured to, and extends upwardly from, the camera base 2. The upper end of this standard carries a rigid lateral extension 171 provided with a lockable set screw 172 lying in the path of, and for limiting the forward oscillatable movement of, the vertical arm 137 of the bell-crank. This standard also carries a bearing and housing 173 for a spring tensioned detent or plunger 174 manipulated by any suitable means such as the hand knob shown in Figs. 4, 15 and 17. An aperture or recess 175, extending inwardly from a side face of said arm, is positioned to register with said plunger whereby said arm may be locked and unlocked by manipulation of said plunger. In the unlocking control of said arm any suitable means may be provided for holding said plunger in its withdrawn position with respect to the recess 175, one such means comprising a transverse pin or other projection 176 carried by the outer end portion of the plunger, which pin is engageable with a lug or cam such as 177 on the plunger housing when the plunger is withdrawn and given a slight rotation. The arm 137 is locked, by said plunger to the standard 170 throughout the time that the spacing mechanism is disconnected to permit manual control of spacing. When spacing is manually controlled, the arm 137 is unlocked each time that spacing is effected.

*To change from automatic to manual film feed*

Assuming that the mechanical and/or automatic setup exists, the following is a description of the steps which are necessary in changing the set-up to make possible line spacings which could not conveniently be made automatically and hence must be made manually. First the electric circuit to and through the film feed solenoid 150 must be broken and for this purpose a switch 178 (see Fig. 18) is provided and which is manipulated by the operator of the camera. Then the adjusting disk 155 on the bell-crank is brought forwardly (toward the operator) to oscillate said bell-crank to a position where the arm 137 thereof may be locked by the plunger 174 rigid with the standard 170. This action serves to push the solenoid plunger into the solenoid coil against the tension of rack spring 154, and thereby "cock" the film rack bar 149, this being made possible through the upward movement of the bell-crank arm 138.

The adjusting disc 155 is then rotated to bring its slot 157 into registration with the forwardly projecting arm 144 at the lower end of the cam bar 139, after which registration said disc is securely clamped as by the knob 156.

Then the larger adjusting disc 159 is loosened through manipulation of the knob 164, and its holding plunger 167 is withdrawn, so that said disc may be rotated to bring the desired bolt thereof into registration with the lateral finger 162 carried by the bell-crank arm 137, and then said disk is locked by releasing said plunger to permit it to engage the indentation on the rear face of said disc corresponding to the desired and selected bolt, and then the knob 164 is turned to clamp said disc with respect to its standard 163. This action results in the manual set-up for the next desired film spacing as measured in 100ths of an inch, said spacing being controlled by the selected bolt.

The operator then closes the switch 215 whereby the electric circuit is completed through solenoid 151 whereby its plunger causes the shutter 23 to be opened to thereby obtain an exposure of the object on the film. The circuit is subsequently opened automatically and electrically when the correct amount of exposure has been effected, by means later to be described. This action however does not move the film.

The next step is to withdraw the plunger 174 from the hole 175 in the bell-crank arm 137, to permit the bell-crank to oscillate in a rearward direction until its finger 162 contacts and comes to rest upon the selected bolt on the larger adjusting disc 159. This rearward oscillatory movement of the bell-crank arm causes the film rack bar 149 to be correspondingly moved under the tension of its spring 154 with coincidental turning of the film feed roller to thereby obtain the desired spacing between the exposure just obtained and the next exposure to be made. If the manual spacing is to be maintained (i. e. made constant) between each two successive lines of reproduced text (or names) then the foregoing set-up needs no change, and each successive exposure is made by operation of said switch button 215 and the spacing between said successive exposures is effected merely by allowing a complete backward and forward movement (cycle) of the bell-crank arm 137.

If however the said manual spacing is to be made of a different amount, then the bell-crank arm 137 is pulled forward and latched by its holding plunger 174 as heretofore described. The purpose of the slot 157 in the adjusting disc 155 is of course to permit the passage therethrough of the cam bar arm 144 during the manual oscillation of said bell-crank. Then the large disc 159 is readjusted to bring a bolt thereof into registration with said finger 162 of the bell-crank which bolt is of a length to give the newly desired line spacing, and then said disc 159 is locked, all in the manner as hereinabove described. This is followed by actuation of said switch button 215 to obtain the exposure, the unlocking of the bell-crank arm 137, and the manual oscillation of the bell-crank to cause the film feed, as heretofore described.

Repetitions of the foregoing steps are made to accomplish successive exposures with the desired line spacing therebetween, and if an exceptional wide spacing is desired it may be accomplished by a mathematical combination of said steps. That is to say if the greatest spacing permitted by the adjusting disc 159 is made possible by its bolt calculated and formed to give a film feed of $70/100$ of an inch, and a line spacing of $280/100$ of an inch is desired, then with said bolt registering with said finger, the bell-crank arm is manually oscillated four times before the next exposure is made; any desired spacing may thus be obtained mathematically through multiplication of oscillation with a particular bolt, or by such multiplication and a readjustment of said disc in accordance with a mathematical increment which will give a sum total which is equal to the desired spacing, all as should be readily understood.

*Control of film exposure*

Figures 10, 11, 12, 13, 14:
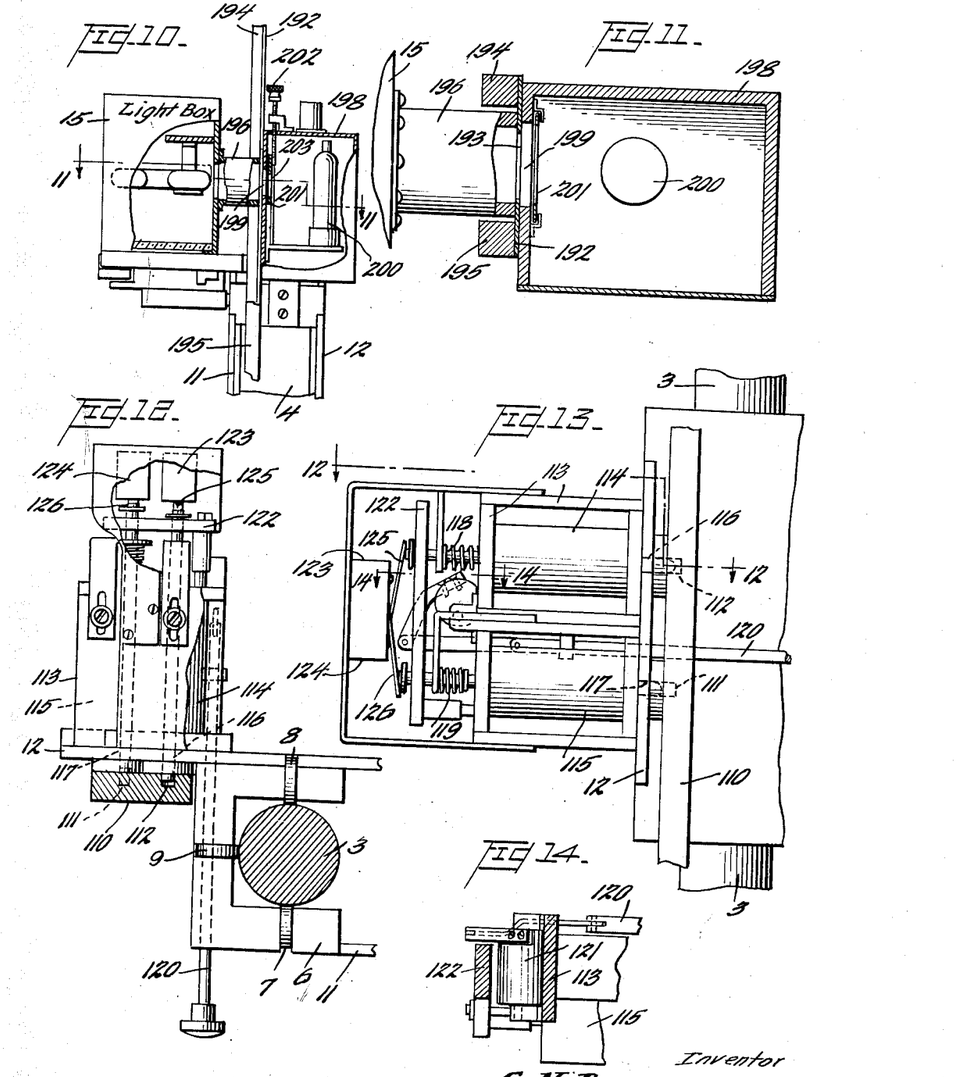
Fig. 10 is an enlarged view partly in section and taken substantially as on the line 10—10 of Fig. 1 and looking in the direction of the arrows, in order to illustrate the cooperative arrangement of a light source and a light responsive element affected by light from said source, all in combination with a slotted member for automatically controlling the amount of light passing from said source to said element, such control being in accordance with the adjusted focused position of the lens.
Fig. 11 is a horizontal sectional view taken as on the line 11—11 of Fig. 10 and looking in the direction of the arrows.
Fig. 12 is a horizontal sectional view taken as on the line 12—12 of Fig. 13 and looking in the direction of the arrows.
Fig. 13 is a side elevational view of a portion of the camera to illustrate particularly the electrical means for locking the vertically slidable carriage in the position to which it is moved to bring about the desired size of enlargement or reduction of the reproduced image on the film.
Fig. 14 is a horizontal sectional view taken as on the line 14—14 of Fig. 13 and looking in the direction of the arrows.

Rigidly mounted on the guide 4 as by the top and bottom brackets 190 and 191 is a light cam comprising a vertical plate 192 in which is formed a downwardly tapering slot 193 through which light rays from the light box 15 may pass (see particularly Figs. 1, 10 and 11). Preferably ribs such as 194 and 195 are secured on the front face of said plate at the vertical edges thereof whereby to form a channel between said ribs and into which extends a tubular shield 196 rigidly mounted on the backside of the light box in registry with an aperture 197 in the rear wall of said light box, the free end of said shield having substantially a sliding contact with the front face of said plate, whereby light rays emanating from the light box may pass through said shield and the light cam slot 193.

Rigidly mounted on, and vertically movable with the carriage 6, is a housing 198 the walls of which are closed with the exception of a slot 199 in the front wall thereof and registrable with the shield 196, whereby the light rays passing through said shield may enter said housing and affect a phototube 200 rigidly mounted in said housing. A slide or opaque diaphragm 201 is mounted on the front wall of said housing, said slide to be manually adjustable exteriorly of said housing by any suitable means such as the stem and knob 202, said slide having an aperture 203 therein registrable with the slot 199 for varying the amount of light rays passed to said phototube.

From the foregoing description it will be understood that in the utilization of this camera for making reproductions of an object contained in the composing frame, it is highly desirable to maintain a uniform density in the reproductions on the film throughout the succession of exposures. This is particularly desirable when making reproductions of objects wherein there are overlapping areas such as caused by the adjoining edge portions of individual letter transparencies forming the composition to be reproduced. In the case where the density might fall below the desired uniform amount, the overlapping edge portions of said transparencies (objects being photographed) would show up as undesirable lines in the reproduction. In the case where the density might be greater than the desired uniform amount, the opaque portion of the reproduction on the film would spread and thus alter the intended width of the lines comprising each letter. Therefore it has been found expedient to provide means to control the time of film exposure whereby to attain said uniformity of film density in the film reproductions, and the mechanism just described constitutes said control means.

Since several exposures are made upon each film strip, the exposure conditions for all sections of a film strip must be accurately controlled to obtain this uniform density in the exposed film strip, and for all strips of any given type of film which are developed under the same conditions. It is not possible to obtain uniform exposures by preselecting a particular exposure timing, since the effective diaphragm aperture or f- value of the lens varies with the focusing of the camera to alter the dimensions of the reproduction of the object in the composing frame. This follows from the fact that the diaphragm openings or f- values (as marked on the barrel of a lens) are accurate only when the lens is focused on infinity. When focused upon a relatively close object, the effective lens aperture is $$\frac{Vf}{F}$$

when V is the lens-to-film distance, F is the focal length of the lens, and $f$ is the marked lens aperture. In the case of a camera with a lens having a focal length of six inches and a copying system for preparing negatives on which the linear dimensions may be adjusted from about 15% to 70% of the corresponding dimensions of the copied material, this variation of effective aperture of any selected diaphragm opening (as marked on the barrel of the camera lens) necessitates a variation of the exposure time, for constant illumination of the material to be copied, of the order of two-to-one from the maximum reduction of 15% to the minimum reduction of 70%.

In addition to this variation of the exposure time, a constant illumination, with the degree of reduction of the material to be copied, the exposure time varies with the intensity of the illumination of the material to be copied, and this intensity varies for a number of reasons, i. e. (1) uncontrollable fluctuation of power line voltage, (2) condition of the source of light (tube) caused by age, and (3) the temperature of the light (tube) at start and after some time of usage; at the start, the intensity is greatest, losing approximately 20% after twenty minutes of use. Further, it is to be understood that the closing actuation of the operator's button or switch 215 causes a light integrator system or unit 212 to energize an electromagnetic device of any suitable type such as the relay 213 whereby its armature 214 will be attracted to close a circuit providing energization of the two solenoids 150 and 151 in the film box, to open the shutter 23, and consequently said electric circuit must be broken in order to permit the closing of said shutter. However, said shutter is to be closed only after sufficient light has passed to the film to give the uniform density thereto, as will be disclosed hereinafter.

The photoelectric control system, for integrating effective light intensity against time to afford a constant foot-candle-seconds exposure of the film strip, includes the light-sensitive cell or phototube 200 in the housing 198 which is mounted on and moves with the carriage 6 carrying the composing frame 14 and the light box 15. The rays of light from the light box are admitted through the shield 196, the light cam slot 193, and the opening 199 in said housing, to the phototube and are modified by the manually operable slide or diaphragm 201 across the slot 199, to control the effective cross-section of the slot 199 in accordance with the "film speed" or light sensitivity of the film upon which the composed line is to be photographically reproduced. The quantity of light energy which reaches the phototube 200 is varied automatically, with the desired size of reduction or focusing of the camera, by means of the tapering light cam slot in the light cam plate 192 (or masking strip) which is rigidly supported in fixed position in the path of the light rays to the phototube. The cam slot 193 varies in width from a maximum at its upper end to a minimum at its lower end, the rate of change being such as to compensate for the variation of the effective aperture of the camera lens when the light box and composing frame are moved up or down to alter the size of the focused image of the composed line or word. The light rays pass through the upper or wider portion of the slot 193 when the camera is focused to reduce the reproduced image length to minimum size, thereby affording a maximum light intensity, in foot-candles, at the phototube, and the light intensity is progressively reduced when the carriage is progressively lowered to obtain reproduced images of larger size.

Figures 19, 20, 20A:
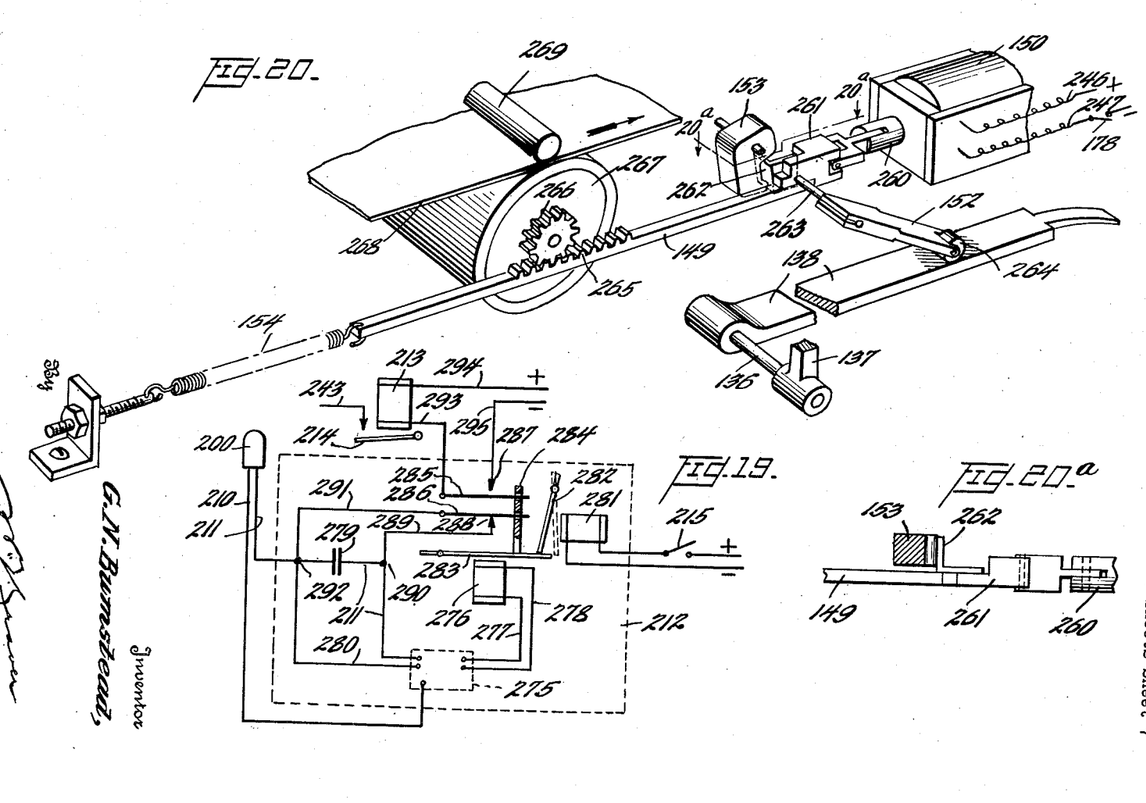
Fig. 19 is a more detailed wiring diagram of some of the circuits shown generally in Fig. 18.
Fig. 20 is a perspective diagrammatic view illustrating the film feed mechanism and control.
Fig. 20a is a horizontal sectional view taken as on the line 20a—20a of Fig. 20 and looking in the direction of the arrows.

The phototube 200 is electrically connected as by the wires 210 and 211 to work into a direct current amplifier and integrating unit, generally and diagrammatically indicated at 212 in Fig. 18 and illustrated more in detail in Fig. 19, of any known or desired type, for energizing the relay 213 or other suitable mechanism which will cause the control circuit of the shutter 23 to be opened when the time integrated light intensity (in foot-candle-seconds) reaches the appropriate value. The sensitivity of the photoelectric control system may be varied in accordance with the light sensitivity or "film speed" of the photographic film by adjustment of the manually operable slide 201 across the slot 199 of the phototube housing 198. No change or adjustment is required for a particular type of film after the initial adjustment which affords a correct exposure at any given image size. Fluctuations in light intensity will not preclude a subsequent correct exposure at the same image size since the light energy is integrated against time to control the closing of the shutter. The same setting of the manual slide 201 affords correct exposure at other image sizes since the varying width of the light cam slot 193 compensates for the variation of the effective aperture of the camera lens with focusing for different image sizes.

Although the illustrated light integrating system includes a phototube for developing a voltage which varies with the illumination of the phototube, it will be apparent that the photoelectric element of the light integrating system may be a barrier layer or current generating photocell which develops a current proportional to the illumination of the photocell.

Wiring diagrams

Appropriate electrical circuits are indicated in Figs. 18 and 19, the control of the carriage operating motor 80, the carriage unlocking solenoids 114 and 115, and the film box moving motor 86, having been referred to hereinbefore. At the upper right of the diagram of Fig. 18, a tap from the main leads for the electric current is indicated connected to the source of light in the light box 15, and another tap is indicated connected to any suitable light integrator unit identified by the numeral 212, and also connected to said unit are the wires 210 and 211 leading from the phototube 200 which is influenced by light rays passing through the tapered slot 193 in the light cam interposed between said light box and said phototube. A relay 213, having the armature 214, has its coil connected to said light integrator unit, and a switch 215 associated with said unit and under the control of the camera operator is provided, which switch when closed by the operator causes energization of said relay and causes its armature to be attracted. When sufficient light energy to give the correct exposure of the film has been received by the phototube, said unit will function in a well known manner to break or open the circuit to said relay and thus cause its armature to drop.

Current from any suitable source other than that referred to in the preceding paragraph, and preferably of the order of 11 volts D. C., is supplied over the wire 230 to the point 231 where said current divides, one portion thereof passing over the wire 232 to and through the coil of solenoid 151 and thence over the wire 233 to the point 234, said solenoid when energized opening the shutter 23 to cause exposure of the film. The other portion of said current passes from point 231 over the wire 235 to the point 236 where it again divides, one portion passing over wire 237 to and through the coil of a relay (of the type to cause time delay in the release of its armature 239) and thence the current passes over wire 240 to said point 234. The other portion of this current passes from point 236 over the wire 241 to the front contact of said armature 239.

The return for this current from point 234 is over wire 242 to the armature 214 of the relay 213 associated with the light integrator unit 212, and through its front contact and over wire 243 to the point 244 and thence back to source over wire 245. The pivot of the armature 239 of the time delay relay 238 is connected as by the wire 246 to pass current to and through the solenoid 150 and thence over wire 247 to said point 244 for return to source over wire 245, there being interposed in wire 247 the switch 178 hereinbefore referred to. The solenoid 150 is provided for attracting rack bar 149 which, upon deenergization of said solenoid, is activated or moved in the opposite direction by its control spring 154 to cause feed of the film to a position ready to receive its next exposure.

Any suitable circuits may be provided for rendering the relay 213 effective as a control for the low voltage currents for opening and closing the camera shutter, but in Fig. 19 there has been indicated in a simplified manner a more detailed wiring which will serve to indicate what takes place in the light integrator unit, it being of course understood that in this simplified showing certain detail equipment (such as electronic tubes etc.) has been omitted in the interest of clarity and, since the details of this integrator system or unit form no part of the present invention, it is believed that this simplified showing is sufficient for the present purpose. In said Fig. 19 the phototube 200 is shown connected as by the wires 210 and 211 to any suitable integrating mechanism generally identified at 275 and supplying voltage to a relay coil 276 as by the wires 277 and 278. In the wire 211 there is interposed a capacitor 279 which serves as an integrator of the phototube current to the end that, when sufficient voltage has been built up across the capacitor by the phototube and is transmitted by wires 280 and 211 to the mechanism indicated at 275 to activate a thyratron tube therein and to cause it to fire, there will result a momentary energization of relay coil 276.

The operator's button or switch 215 is interposed in the leads of a circuit including a second relay coil 281 whereby, when said switch is closed, current from a suitable source will energize said coil and attract its armature 282 thereby unlatching armature 283 associated with the first mentioned relay coil 276. Said armature 283 carries a bracket 284 appropriately apertured to receive the free ends of a pair of pivoted parallel switch blades 285 and 286 whereby said switch blades will move in unison and make respective electrical contacts with the contact points 287 and 288 associated with armature 283. When coil 276 is energized its armature 283 will be attracted and said switch blades will be in their down positions (as seen in this figure of drawing) with the blade 286 in contact with the contact point 288 which is connected by wire 289 to the wire 211 at the point 290 located to one side of the capacitor 279. The pivot of blade 286 is connected as by the wire 291 to the wire 211 at the point 292 located on the other side of said capacitor, whereby said capacitor is shorted by the contact of blade 286 with its contact point 288, and no voltage will be built up on said capacitor. The other switch blade 285 has its pivot connected as by the wire 293 to the coil of relay 213 which receives current from any suitable source as over wire 294, the contact point 287 being connected as by the wire 295 to said source for completion of the coil circuit when the switch blade 285 is in its up position.

From the above description it will be seen that when the operator's switch 215 is closed, current will energize coil 281 and attract its associated armature 282 which, upon said attraction, moves off of armature 283 associated with coil 276 thereby unlatching the latter armature which thereupon is free to move upwardly (by virtue of its spring mounting as readily understood), and in this upward movement carry the interconnected switch blades so that blade 285 closes with contact point 287 and causes energization of relay coil 213. Concurrently the other blade 286 breaks with its contact point 288 thereby allowing phototube current to charge the capacitor 279 until the voltage across said capacitor has built up to cause the firing of the thyratron tube in the mechanism 275, thereby delivering sufficient current to energize the coil 276, which energization attracts the armature 283 and moves the pair of blades reversely to break the circuit through relay coil 213 and to close the capacitor by-pass and hence stop the charging of said capacitor.

It is to be understood that the operator's switch 215 need only be momentarily closed to unlatch the armature 283 and thus initiate the energization of relay coil 213. Consequently the armature 282 of coil 281 is free to move away from said coil by virtue of its spring mounting, when the operator's switch is released or opened, but said armature will be stopped in this movement by coming in contact with the extreme end of armature 283. However, when coil 276 is subsequently energized its armature 283 will be attracted and moved to a point beyond the extremity of armature 282 whereupon the latter (under its spring tension) will move farther and to the position illustrated to cause a latching of armature 283 in its attracted position. The cycle of operation hereinbefore described will then be repeated upon the next closing of the operator's switch.

Thus it will be understood (with reference to Figs. 18 and 19) that current from the light integrator unit 212 will energize relay 213 when the operator's switch 215 is closed, whereupon armature 214 will move to its front contact and permit the 11 volts D. C. current to energize the time delay relay 238 as well as the solenoids 150 and 151, the switch 178 being closed at all times except when manual feed of the film is desired as hereinbefore explained. When relay 238 is energized its armature 239 will be attracted and close with its front contact to permit the energization of solenoid 150. When solenoid 150 is energized, the rack bar 149 will be attracted or moved into its "cocked" position and held there until said solenoid is deenergized. When solenoid 151 is energized it will open (and hold open) the spring tensioned shutter 23. Shutter 23 will remain open until its actuating solenoid 151 is deenergized.

When sufficient light has passed through the open shutter to give the correct film exposure, a sufficient charge of electricity will have passed through the phototube 200 to cause the light integrator unit 212 to function, opening the circuit to relay 213, and simultaneously rendering further phototube current ineffective upon the light integrator unit until such time as the operator's switch 215 is again closed. When the circuit of relay 213 is thus opened, its armature will drop and thus open the 11 volts D. C. circuit, immediately deenergizing solenoid 151 and permitting the shutter 23 to close under the urge of its spring. However, due to the time delay feature of relay 238, its armature 239 will be momentarily delayed in its movement away from its front contact, and hence current through solenoid 150 will be maintained until said armature drops, thereby insuring the complete closing of the shutter before solenoid 150 has released (due to its deenergization) the film moving rack bar 149. The circuits through the solenoids 150 and 151 as well as through the time delay relay 238 are the same as those disclosed in my copending application Serial No. 21,994 with the exception that the simple switch (identified in said application by the numeral 171) is replaced in Fig. 18 of this instant application by the relay 213 under the control of the light integrator unit 212.

*Film feed*

Whereas the film feed is amply disclosed and claimed in my copending application Serial No. 21,994, it is believed that a short description and illustration thereof should be included here in order to make a complete and operative whole, and therefore Fig. 20 is a perspective diagrammatic representation of such feed, and Fig. 20a is a horizontal sectional view better illustrating the means for limiting the effective movement of the rack bar 149 to cause feeding of the film.

The solenoid 150 has the end of its plunger 260 linked to a member 261 which is rigidly secured to one end of the rack bar 149, the other end of said bar being connected to and under the tension of the coil spring 154, so that said spring normally exerts a pressure such as to move said bar lengthwise to the left as seen in this figure of drawing, said bar being substantially in aligned prolongation of the solenoid plunger. Therefore it will be understood that when the solenoid is energized, as hereinbefore described, said rack bar will be moved lengthwise in the opposite direction against the tension of said spring. The member 261 has a lateral projection 262 adapted to contact the lower end of a lever arm 153 pivotally and rigidly mounted on the axle 263, and upon one end of said axle is rigidly secured the uppermost end of the arm 152 whose lowermost end carries the roller 264 in surface contact with the lever arm 138 of the bell-crank 137—138, both of the arms of this bell-crank for convenience being rigidly secured to the pin 136. Hence, as the bell-crank arm 137 is oscillated by the film feed control mechanism hereinbefore described, the arm 152 will be correspondingly oscillated with the result that the lever 153 will be moved adjustably to permit a longer or shorter lengthwise movement of the rack bar 149.

A section of the upper surface of said bar is formed with rack teeth or cogs 265 constantly enmeshed with the teeth of a pinion 266 carried by the main film feed roller 267, the strip of film 268 being pressed against the surface of said roller 267 by an auxiliary pressure roll 269 thereabove. The main feed roller 267 has a clutch mechanism at each of its ends, whereby rotation in one direction only may be given to said roller through one of the clutches, retrograde or reverse rotation of said roller being prevented by the other of the clutches; that is to say the clutches are opposite in their function though they may be of similar construction. The clutches are so designed and installed that when the solenoid 150 attracts the rack bar 149 (to move it to the right as seen in Fig. 20) the clutch associated with the pinion 266 will slip whereas the other clutch will hold and therefore prevent any rotation of the feed roller 267. On the other hand, when said solenoid becomes deenergized the rack bar will move in the opposite direction (to the left) under the urge of its spring 154, thereby rotating the pinion 266 reversely and, through its associated clutch, cause a clockwise rotation of the feed roller (the other clutch slipping in this case) and so advance or feed the strip of film whose movement is indicated in the direction of the arrow, the extent of this movement (or spacing of the film) being stopped when the lateral extension 262 on said bar comes to rest against the lever 153, the adjustment of said lever being controlled by the bellcrank 137—138.

Summary

From the foregoing description, and the drawings, it will be seen that by this invention there is provided a photographic apparatus for obtaining, upon a photographically sensitized film or sheet, a series of reproductions of objects such as transparencies. Said apparatus broadly comprises a film support, and an object support having relative movement with respect to the film support, and a lens interposed between the film support and the object support, and cam means for automatically focusing the lens and responsive to the movement of one of the supports, and means for moving the film between successive exposures thereof, and a second cam means for automatically controlling the distance that the film is moved, said second cam means also and simultaneously activated with the lens focusing cam means by the movement of the movable support.

More specifically, each cam means comprises a member supported at its upper end by a fixed pivot and having its lower end linked in the one instance to the lens support and in the other instance to the film moving means, the cam surface of each member in constant contact with a portion of the movable support whereby oscillation is given to each cam member in the vertical movement of the movable support. Two cams are provided, in the one instance for automatically focusing the lens, and in the other instance for automatically controlling the distance that the film is moved, all in accordance with the size of the reproduced image desired on the film.

The source of light may be as desired, either natural (solar) or of any suitable artificial (electric lamp or tube) type. Due to variations in the intensity of the illumination and the lens focusing, and since uniform density is desirable in the plurality of successive reproduced images on the strip of film (or sensitized sheet), a mask is provided in conjunction with a photoelectric element and a light-integrating system including a control circuit, for modulating the amount of light passed through the camera shutter to the film, whereby the shutter is automatically and electrically caused to close when the integrated light intensity passed to the film reaches a preselected foot-candle-seconds value. The mask may be of any suitable type, is mounted to provide relative movement with respect to the light source, and comprises a combination of areas of different and/or varying opacity, the varying opacity preferably made possible by making one of the areas tapering or wedge shaped. Thus, the mask may be stationary or movable, of rigid or flexible material, with the light-passing area comprising an open portion (cut-out or slot), or a solid portion whose opacity is less than the opacity of the remainder of the mask.

The feed of the film comprises means for changing from a certain amount to a different amount, in accordance with the size of the reproduced images desired on the film, and while maintaining the automatic cam control. The film feed may be taken as the distance between the centers of two successive and adjoining reproduced images, and hence includes the space between the bottom limit of one image and the top limit of the next image. Broadly, this means comprises a cam which may have its effective surfaces selectively interposed in the linkage between the film moving means and the cam controlling the same. More specifically, there is provided a rotatably adjustable disc for this purpose, said disc having a circular series of lateral projections (bolts) of progressively different extent, the rotation of said disc bringing a selected projection thereof into registration with members of said linkage for the effective operation thereof. Said disc has a peripheral cut-away portion which serves to by-pass a member of said linkage, and this cut-away portion is selectively brought into registration with the linkage, by rotation of said disc, when a change from automatic to manual control of the film feed is desired.

The light-integrating system may be of any desired and suitable character (there being patentably known many different arrangements or types) so long as the illumination received is controllable to result in a total intensity having a preselected foot-candle-seconds value, which value when reached is capable of affecting a control circuit in the system. More specifically the control of the illumination comprises the mask and coactive photoelectric element heretofore mentioned, and the control circuit affected by the preselected value of integrated light intensity comprises an electromagnetic device for causing the closing of the shutter to terminate the exposure of the film. Claims to a copying camera including photoelectric means for automatically regulating the exposure period are presented in my copending application Serial No. 222,755, filed April 25, 1951.

It is obvious that those skilled in the art may vary the details of construction and arrangements of parts without departing from the spirit of this invention, wherefore it is desired not to be limited to the exact foregoing disclosure except as may be required by the claims. While the photosensitive material upon which the image is to be projected has been described as a "film," it is to be understood that the term "film" is used in a broad sense in the following claims and is intended to include photosensitive layers on paper, glass plates and the like as well as photosensitive layers on films.

What is claimed is:

1. In a photographic reproduction apparatus, the combination with a film support, an object support, a base within which said film support is located, a pair of guide bars extending vertically upwardly from said base, means mounting said object support on said guide bars for vertical adjustment towards and away from said base to determine the size of the reproduction, a lens assembly mounted on said base between said film support and said object support and adjustable for focusing an image of an object on said object support upon a film on the film support; of automatic focusing means for adjusting said lens assembly in response to movement of said object support, said automatic means comprising a cam bar pivotally supported upon the upper end of one of said guide bars for rocking movement in a vertical plane normal to the vertical plane of symmetry through the axes of said guide bars, said cam bar extending vertically downward along said one guide bar upon which it is supported and having one edge thereof shaped to constitute a cam surface, a cooperating cam actuator carried by said movably mounted object support, a cam arm secured to the lower end of said cam bar, and a linkage pivotally mounted on said base and having one arm engaging said lens assembly to adjust the same, said linkage by its weight biasing a second arm thereof into engagement with said cam arm to retain the cam surface of said cam bar in engagement with said cam actuator.

2. In a photographic reproduction apparatus a film support, an object support having movement with respect to the film support in order to adjust for variations in the size of the reproduced image desired on the film, a lens assembly including a lens interposed between the film support and the object support, cam means operable by movement of said object support and linked to said lens for automatically focusing the lens in accordance with the adjustment for size of reproduction desired, spring tensioned means for moving the film between successive exposures thereon, angularly adjustable stop means to limit the displacement of the film by said spring tensioned means, a lever mounted on the base having an arm cooperating with said stop means and a second arm, a pivotally supported cam bar extending along the path of movement of said object support and having a free end adjacent the second arm of said lever, one edge of said cam bar being shaped to constitute a cam surface, a cooperating cam actuator carried by said object support, cooperating contact means carried by said second arm of the lever and said free end of said cam bar, and means retaining said cooperating contact means in engagement and a second cam means operable by movement of said object support and linked to said film moving means for automatically controlling the distance that the film is moved between successive exposures thereof.

3. In a photographic apparatus for obtaining reproductions of a transparent object upon a photographically sensitized film, the combination of a frame for holding the object; a carriage for supporting said frame, reversible motor means for moving said carriage vertically toward and away from the film to determine the size of the reproduced image desired on the film; electrically controlled locking means for securing said carriage in any desired one of a plurality of positions corresponding respectively to different reproduced image sizes, said locking means automatically becoming effective when such position is reached; a lens assembly including a lens interposed between said frame and the film, said lens movable along the vertical axis of light rays passing through said frame from a light source; and means for automatically adjusting the position of said lens for focusing in accordance with the position to which said carriage is moved.

4. In a photographic apparatus for obtaining reproductions of a transparent object upon a photographically sensitized film, the combination of a frame for holding the object; a carriage for supporting said frame, reversible motor means for moving said carriage vertically toward and away from the film to a position commensurately in accordance with the size of the reproduced image desired on the film; locking means for securing said carriage in such commensurate position, a lens assembly including a lens interposed between said frame and the film, said lens movable along the vertical axis of light rays passing through said frame from a light source; and means actuated by said carriage for automatically adjusting the position of said lens for focusing in accordance with the position to which said carriage is moved; said locking means comprising a plunger spring-urged into locking position and a solenoid for moving said plunger into release position, and circuit means for energizing said solenoid simultaneously with energization of said reversible motor means.

5. In a photographic reproduction apparatus, the combination with a film support, an object support, a base having a guide structure thereon, means mounting one of said supports on said guide structure for movement towards and away from the second support to determine the size of the reproduction, a lens assembly on said base between said supports and including a lever pivotally mounted on said base and adjustable to focus an image of an object carried by said object support upon a film carried by said film support, and film-feed means at said film support and operable between successive exposures to move a film, said film-feed means including stop means adjustable to determine the distance a film is moved at each operation of said film-feed means and a lever pivotally mounted on said base for adjusting said stop means, of means actuated by said movable support on movement thereof to adjust said lens to maintain the focus of the image upon a film, means actuated by said movable support on movement thereof to adjust said lever of the film-feed means to maintain the distance of film movement equal to the dimension of the image in the direction of film movement plus a spacing increment varying with the image size; one of said actuated means comprising a cam bar pivotally supported on said guide structure at a point beyond the most remote position of said movable support with respect to the second support, said cam bar extending along the path of movement of said movable support and having a cam surface, a cooperating cam element movable with said movable support, contact means at the free end of said cam bar engaging an arm of the associated lever to actuate the same in accordance with the position of said movable support with respect to said second support, and means maintaining the cam surface of said cam bar in contact with said cooperating cam element throughout the range of movement of said movable support.

6. In a photographic reproduction apparatus, the invention as recited in claim 5, wherein said actuated means comprising a cam bar constitutes the means for adjusting said lever of said lens assembly.

7. In a photographic reproduction apparatus, the invention as recited in claim 5, wherein said actuated means comprising a cam bar constitutes the means for adjusting said lever of said film-feed means.

8. In a photographic reproduction apparatus, the invention as recited in claim 7, in combination with manually operable means on an arm of the lever of said film-feed means and in engagement with the contact means of the cam bar for varying the angular position of said lever with respect to said contact means, thereby to determine the magnitude of the preselected ratio of film movement to said image dimension.

9. In a photographic reproduction apparatus, the invention as recited in claim 5, wherein said movable support is said object support.

10. In a photographic reproduction apparatus, the invention as recited in claim 9, wherein said object support comprises a frame on which a transparent object may be positioned, in combination with a light source above said object support for illuminating an object on said frame, and means mounting said light source for movement with said object support.

11. In a photographic reproduction apparatus provided with a film support, and an object support vertically above and having relative movement with respect to the film support in order to adjust for variations in the size of the reproduction desired, the combination of a lens assembly interposed between the film support and the object support, said assembly comprising a rigidly mounted outer tubular housing provided with vertical and diametrically opposed slots, a tubular member slidable within said housing and provided with an extension passing outwardly through each slot, a lens rigidly supported within said tubular member, a pivoted fork having its legs embracing said housing and with the ends thereof beneath the respective extensions of said tubular member, said extensions being maintained in contact with the legs of said pivoted fork by the weight of said tubular member and lens; and means including a cam bar actuated by said movable object support for rocking said pivoted fork to focus said lens in accordance with the desired size of reproduction.

12. In a photographic reproduction apparatus, the invention as recited in claim 1, wherein said focusing means mounted on the lower end of said one guide bar and includes means guiding the free end of said cam bar to maintain contact thereof with said linkage.

13. In a photographic reproduction apparatus, the invention as recited in claim 1, wherein said lens assembly includes a tubular housing rigidly mounted upon said base, a tubular member slidable within said housing and supporting a lens, and means on said tubular member supporting the same on said first arm of said linkage, said tubular member by its weight retaining said supporting means in engagement with said first arm of the linkage.

14. In a photographic reproduction apparatus, the invention as recited in claim 13, in combination with a spring compensating in part for the gravity-produced forces tending to effect a downward movement of the tubular member of the lens assembly.

15. In a photographic reproduction apparatus, the combination with a film support, an object support, a base upon which one of said supports is mounted, guide bars extending upward vertically from said base, a lens on said base between said supports, and means mounting the second support on said guide bars for vertical adjustment toward and away from said base to determine the size of the reproductions; of film feed mechanism including spring tension means for adjusting said film after each exposure thereof, and automatic means for adjusting said film feed mechanism in response to movement of said second support on said guide bars; said automatic means comprising a cam bar pivotally supported upon the upper end of one of said guide bars for rocking movement in a vertical plane normal to the vertical plane of symmetry of said guide bars, said cam bar extending vertically downward with an arm secured thereto adjacent the base and carrying a roller, said cam bar having one edge thereof shaped to constitute a cam surface, a cooperating cam actuator carried by said movably mounted support, a two-armed lever pivotally mounted upon said base, one arm constituting a stop for limiting the displacement of said film, and manually adjustable means carried by the second arm of said lever for contacting the roller of said cam bar to vary the angular adjustment of said lever for a given position of said cam bar.

GEORGE NEWMAN BUMSTEAD.

References Cited in the file of this patent

UNITED STATES PATENTS

| Number | Name | Date |
|---|---|---|
| 1,107,520 | Holst | Aug. 18, 1914 |
| 1,821,923 | Beidler | Sept. 8, 1931 |
| 2,003,691 | Lundberg | June 4, 1935 |
| 2,099,681 | Draeger | Nov. 23, 1937 |
| 2,158,039 | Wenczler | May 9, 1939 |
| 2,293,425 | Dammond | Aug. 18, 1942 |
| 2,327,086 | Youngberg | Aug. 17, 1943 |
| 2,364,362 | Hopkins | Dec. 5, 1944 |
| 2,397,668 | Kesses | Apr. 2, 1946 |
| 2,415,424 | Gaebel | Feb. 11, 1947 |
| 2,418,230 | Jacobson | Apr. 1, 1947 |
| 2,462,340 | Simmon | Feb. 22, 1949 |
| 2,469,076 | Rabinowitz | May 3, 1949 |

FOREIGN PATENTS

| Number | Country | Date |
|---|---|---|
| 363,896 | Great Britain | Dec. 31, 1931 |
| 610,146 | Germany | Mar. 4, 1935 |